(12) United States Patent
Chalmers et al.

(10) Patent No.: US 10,315,952 B2
(45) Date of Patent: Jun. 11, 2019

(54) GEOPOLYMER CEMENT

(71) Applicant: CEMENT AUSTRALIA PTY LIMITED, Darra (AU)

(72) Inventors: Desmond Peter Chalmers, Victoria Point (AU); Paul Gregory Kidd, Bellbowrie (AU); Peter David Sleep, Redbank Plains (AU)

(73) Assignee: CEMENT AUSTRALIA PTY LIMITED, Darra, Queensland (AU)

( * ) Notice: Subject to any disclaimer, the term of this patent is extended or adjusted under 35 U.S.C. 154(b) by 204 days.

(21) Appl. No.: 14/441,976

(22) PCT Filed: Nov. 13, 2013

(86) PCT No.: PCT/AU2013/001309
§ 371 (c)(1),
(2) Date: May 11, 2015

(87) PCT Pub. No.: WO2014/075134
PCT Pub. Date: May 22, 2014

(65) Prior Publication Data
US 2015/0321954 A1 Nov. 12, 2015

(30) Foreign Application Priority Data

Nov. 13, 2012 (AU) ................................ 2012904996

(51) Int. Cl.
| | | |
|---|---|---|
| *C04B 7/02* | (2006.01) |
| *C04B 7/26* | (2006.01) |
| *C04B 14/04* | (2006.01) |
| *C04B 14/22* | (2006.01) |
| *C04B 14/28* | (2006.01) |
| *C04B 7/28* | (2006.01) |
| *C04B 28/00* | (2006.01) |

(52) U.S. Cl.
CPC ................ *C04B 7/26* (2013.01); *C04B 7/28* (2013.01); *C04B 28/006* (2013.01); *Y02P 40/165* (2015.11); *Y02W 30/92* (2015.05); *Y02W 30/94* (2015.05)

(58) Field of Classification Search
CPC .... C04B 7/02; C04B 7/26; C04B 7/28; C04B 14/047; C04B 14/22; C04B 14/28; C04B 18/08; C04B 18/141; C04B 20/008; C04B 22/0013; C04B 22/064; C04B 22/10; C04B 28/006; C04B 12/005

See application file for complete search history.

(56) References Cited

U.S. PATENT DOCUMENTS

| | | | | |
|---|---|---|---|---|
| 5,387,283 A * | 2/1995 | Kirkpatrick | ............. | C04B 28/02 106/705 |
| 6,783,799 B1 * | 8/2004 | Goodson | ................. | B32B 13/00 427/136 |
| 2007/0151483 A1 * | 7/2007 | Kato | ..................... | C04B 22/064 106/638 |
| 2008/0066652 A1 | 3/2008 | Fraser et al. | | |
| 2010/0058957 A1 * | 3/2010 | Boxley | ................. | C04B 28/006 106/709 |
| 2011/0259245 A1 * | 10/2011 | Sperisen | ............... | C04B 28/006 106/624 |
| 2012/0152153 A1 * | 6/2012 | Gong | .................... | C04B 28/006 106/705 |

FOREIGN PATENT DOCUMENTS

| | | |
|---|---|---|
| AU | 2007200076 A1 | 7/2008 |
| CN | 101423343 A | 5/2009 |
| CN | 101786821 A | 7/2010 |
| EP | 2502890 A1 | 9/2012 |
| WO | 2005075374 A1 | 8/2005 |
| WO | 2007109862 A1 | 10/2007 |
| WO | 2014/075134 A1 | 5/2014 |

OTHER PUBLICATIONS

International Search Report for PCT/AU2013/001309 (published as WO 2014/075134), 3 pages, dated Jan. 24, 2014.
International Preliminary Report on Patentability for PCT/AU2013/001309 (published as WO 2014/075134), 6 pages, Mar. 2, 2015.

* cited by examiner

*Primary Examiner* — Anthony J Green
(74) *Attorney, Agent, or Firm* — Heslin Rothenberg Farley and Mesiti PC

(57) ABSTRACT

A solid component activator for use in a geopolymer cement containing a silico-aluminate material comprising a mixture of sodium silicate and sodium carbonate for activating the geopolymer cement by increasing reactivity of the silico-aluminate material in the geopolymer cement when forming geopolymer concrete.

15 Claims, 1 Drawing Sheet

GEOPOLYMER CEMENT

CROSS REFERENCE TO RELATED APPLICATIONS

This application is a U.S. National Stage Filing of PCT Application No. PCT/AU2013/001309 filed on Nov. 13, 2013, and published in English as WO 2014/075134 A1 on May 22, 2014, and claims priority of Australian patent application number 2012904996 filed on Nov. 13, 2012, the entire disclosure of these applications being hereby incorporated herein by reference.

FIELD OF INVENTION

The present invention relates to a geopolymer cement. In one form, the present invention relates to a geopolymer cement which is a substitute for Portland cement. In one form, the present invention relates to a geopolymer cement which includes a solid component activator.

BACKGROUND OF THE INVENTION

Concrete made from Portland cement (also known as Ordinary Portland Cement (OPC)) is a material that can be used in civil engineering infrastructures. However, the production of Portland cement concrete typically results in large carbon dioxide emissions and consequently has a large carbon footprint. In an attempt to address these shortcomings, other materials such as, for example, geopolymers have been used as a substitute for Portland cement.

Geopolymer concrete provides an alternative low carbon footprint option to Portland cement concrete. Generally, geopolymer concrete is formed by mixing a binder (also known as cement) and aggregates (such as gravel and sand) with water. The binder typically includes metallurgical slags and/or coal fly ash mixed with an alkali liquid activator such as sodium hydroxide (also known as caustic soda). The alkali liquid activator serves to increase the reactivity of the solid components during the concrete preparation step.

A disadvantage of using alkali liquid activators is that they pose an Occupational Health and Safety (OH&S) hazard and may cause severe injuries such as chemical burns if spilt during transportation and/or concrete manufacture. These liquid activators may also pose an environmental hazard if they leak from their containment vessels and/or when they are discarded or disposed of.

Thus, there is a need for an activator for the production of geopolymer cement that makes it safe and easy to handle. Preferably, this geopolymer cement can produce concrete with comparable properties to concrete made with geopolymer cement made using a liquid alkali activator or with Portland cement.

SUMMARY OF THE INVENTION

In one form of the invention, there is provided a solid component activator for use in a geopolymer cement comprising a silico-aluminate material comprising a mixture of sodium silicate and sodium carbonate for activating the geopolymer cement by increasing reactivity of the silico-aluminate material in the geopolymer cement when forming geopolymer concrete.

The solid component activator of the present invention is stable in the atmosphere unlike activators such as hygroscopic sodium hydroxide that readily absorb moisture from the atmosphere. Accordingly, the solid component activator can be pre-mixed with silico-aluminate material to create a cement and the cement can be stored stably before being transported and/or sold in a ready-for-use dry powder form.

Additionally, the solid component activator does not possess a Dangerous Goods classification. The solid component activator may also yield a product with a similar level of alkalinity to OPC. This provides a safer manufacturing process as well as a safer work environment when the geopolymer cement is used in the preparation or manufacture of concrete.

The sodium silicate of the solid component activator may have a modulus ranging from 1.5-3.3. The modulus in this range improves reactivity of the geopolymer cement.

The sodium carbonate of the solid component activator may have a median particle size ranging from 80 to 500 microns. In one form of the invention, the median particle size ranges from 80 to 200 microns. In another form of the invention, the median particle size ranges from 200 to 300 microns. In a further form of the invention, the median particle size ranges from 300 to 500 microns.

The solid component activator provides a high pH solution when mixed with water or an aqueous solution to activate the silico-aluminate material in the geopolymer cement, thereby increasing the reactivity of the silico-aluminate material (i.e. activating the geopolymer cement) and enabling it to form concrete with desirable or required properties or characteristics.

In another form of the invention, there is provided a geopolymer cement comprising at least one silico-aluminate material, a solid component activator comprising sodium carbonate and sodium silicate for activating the at least one silico-aluminate material for forming a geopolymer concrete.

The at least one silico-aluminate material may comprise any one or a combination of fly ash, pitchstone, blast furnace slag, ground glass or zeolite. Preferably, the at least one silico-aluminate material comprises fly ash and granulated blast furnace slag.

The geopolymer cement may include mineral additives such as, for example, limestone to adjust the properties of the cement.

The silico-aluminate material may have a median particle size ranging from 3 to 25 microns. Preferably, the fly ash has a median particle size ranging from 3 to 20 microns. More preferably, the slag has a median particle size ranging from 5 to 20 microns.

It was found that using silico-aluminate material with a median particle size range from 3 to 10 microns increases the reactivity of the silico-aluminate material by increasing the surface area:volume ratio of the particles. A fly ash with a median particle size range from 3 to 10 microns also increases the reactivity of the fly ash. It was also found that slag with a median particle size range from 5 to 10 microns increases the early age reactivity of the geopolymer cement and the compressive strength of the geopolymer concrete formed using the geopolymer cement. Preferably, the slag is ground to a median particle size range from 5 to 10 microns.

The geopolymer cement may further include a retarder comprising either boric acid or salts of boric acid for increasing concrete setting time. Alternatively, the geopolymer cement may further include an accelerator comprising soluble calcium-based material such as hydrated lime, quicklime or Portland cement for reducing concrete setting time.

The solid component activator in the geopolymer cement allows the use of separate retarders or accelerators to control the setting time of the geopolymer cement. The retarders or accelerators may also control the setting time of the concrete made using the geopolymer cement.

In another form of the invention, there is provided a method for preparing a geopolymer cement including the steps of: mixing at least one silico-aluminate material with sodium carbonate; grinding the at least one silico-aluminate material and sodium carbonate to a median particle size ranging from 3 to 20 microns to form a powdered mixture; and mixing sodium silicate with the powdered mixture to form the geopolymer cement. Preferably, the at least one silico-aluminate material and sodium carbonate is ground to a median particle size ranging from 3 to 15 microns.

The grinding and mixing processes increase the fineness and homogeneity of the powdered mixture to improve properties including solubility and reactivity when water is added to the powdered mixture. Although sodium silicate can be ground and mixed with other components when preparing the geopolymer cement, it is preferable that the sodium silicate is not ground to avoid exposing the sodium silicate to heat degradation. In this respect, mixing the sodium silicate with the powdered mixture reduces heat degradation of sodium silicate by not exposing the sodium silicate to heat generated during the grinding process.

The geopolymer cement may be prepared at a temperature ranging from 10° C. to 40° C.

The geopolymer cement may be prepared at ambient temperature without heating. Particularly, the activator comprising sodium silicate and sodium carbonate can be combined at ambient temperature without heating.

The method may include a step of adding a retarder to the powdered mixture for increasing concrete setting time. Alternatively, the retarder may be added to the geopolymer cement after mixing sodium silicate with the powdered mixture. The retarder may comprise either boric acid or salts of boric acid.

The method may include a step of adding an accelerator to the powdered mixture for reducing concrete setting time. Alternatively, the accelerator may be added to the geopolymer cement after mixing sodium silicate with the powdered mixture. The accelerator may comprise soluble calcium-based material such as, for example, hydrated lime, quicklime or Portland cement.

In another form of the invention, there is provided a geopolymer concrete comprising at least one silico-aluminate material, a solid component activator comprising sodium carbonate and sodium silicate, an aggregate and water, wherein the water solubilises the solid component activator to form an alkaline environment for activating the at least one silico-aluminate material to bind the at least one silico-aluminate material with the aggregate to form the geopolymer concrete.

The alkaline environment requires a pH ranging from 12 to 14 to provide an adequate rate of activation.

The geopolymer concrete may flow at up to 650 mm spread without segregating components of the geopolymer concrete.

In another form of the invention, there is provided a method for preparing a geopolymer concrete including the steps of: mixing at least one silico-aluminate material with sodium carbonate; grinding the at least one silico-aluminate material and sodium carbonate to a median particle size ranging from 3 to 20 microns to form a powdered mixture; mixing sodium silicate with the powdered mixture; and adding water to the sodium silicate and the powdered mixture to form the geopolymer concrete. Preferably, the at least one silico-aluminate material and sodium carbonate is ground to a median particle size ranging from 3 to 15 microns.

The geopolymer concrete produced may have comparable strength properties such as, for example, compressive and tensile strengths, to Portland cement concrete. The geopolymer concrete produced may also have comparable strength properties to geopolymer concrete made using liquid alkali activators.

The method may include a step of adding an aggregate such as gravel and sand to form the geopolymer concrete. Preferably, the aggregate is inert and does not react with water or cement.

The method may include a step of adding a retarder for increasing concrete setting time to the geopolymer concrete, the retarder comprising either boric acid or salts of boric acid.

The method may include a step of adding an accelerator for reducing concrete setting time to the geopolymer concrete, the accelerator comprising soluble calcium-based material such as, for example, hydrated lime, quicklime or Portland cement.

The step of adding water may provide a flowing geopolymer concrete at up to 650 mm spread without segregating components of the geopolymer concrete.

The method may include a step of curing the geopolymer concrete at a temperature ranging from 10° C. to 40° C. to achieve strength growth rates similar to Portland cement concrete.

The geopolymer concrete may include a step of curing the geopolymer concrete at a temperature ranging from 40° C. to 70° C. to accelerate strength growth rates. For example, the geopolymer concrete heated at 70° C. for 4 hours can achieve about 40% maximum compressive strength. In another example, the geopolymer concrete heated at 70° C. for 12 hours can achieve about 80% maximum compressive strength.

BRIEF DESCRIPTION OF DRAWINGS

A preferred embodiment of the present invention is hereinafter described by way of example only, with reference to the accompanying figures, wherein.

DETAILED DESCRIPTION

Figure 1A:
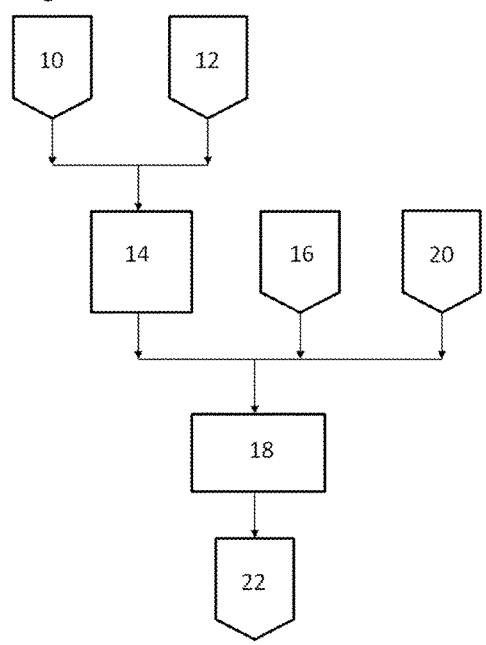
FIGS. 1A and 1B are process flow diagrams illustrating the production of geopolymer cement according to one form of the present invention.
Figure 1B:
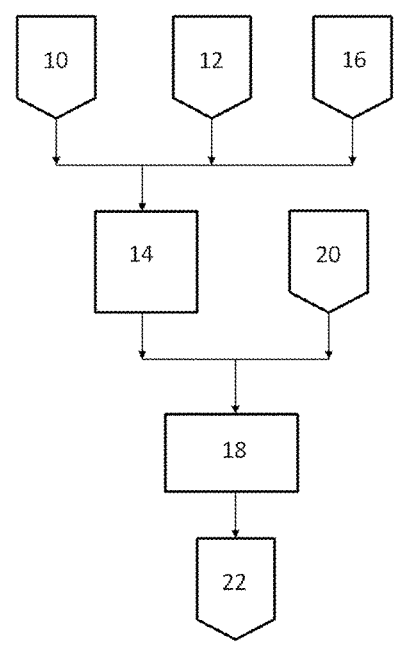

The geopolymer cement of the present invention is manufactured according to the process flow diagram of FIGS. 1A and 1B.

Silico-aluminate material in the form of fly ash in hopper 10 and granulated slag in hopper 12 are milled in grinder 14 before being blended with sodium carbonate 16 and sodium silicate 20 in blender 18 (FIG. 1A). Alternatively, the sodium carbonate 16 may be milled and mixed together in grinder 14 (FIG. 1B).

The fly ash can be obtained from coal-fired power stations (such as for example the Gladstone Power Station in Central Queensland). Fly ash from the Gladstone Power Station typically possesses a high glass content, a median particle size of about 10 microns and a high degree of sphericity. These properties make the fly ash suitable for preparing geopolymer cement according to the present invention.

However, it can be appreciated that the fly ash used to prepare the geopolymer cement does not need to possess all these properties.

Table 1 compares the compressive strengths of geopolymer concrete made using fly ash from different sources in geopolymer cement G1 according to the present invention.

TABLE 1

Fly Ash Trials - Australian Fly Ash Sources

Geopolymer Concrete:

| Binder Type | G1 |
| Binder Quantity | 440 kg·m$^{-3}$ |
| Concrete Curing Temperature | 23° C. |

| | | Slump | Compressive Strength (MPa) | | | |
| --- | --- | --- | --- | --- | --- | --- |
| Fly Ash | W/C | (mm) | 7 days | 28 days | 56 days | 90 days |
| Swanbank | 0.46 | 70 | 14.4 | 39.9 | 50.3 | 50.0 |
| Tarong | 0.29 | 180 | 28.9 | 54.7 | 62.4 | — |
| Mt Piper | 0.37 | 90 | 29.6 | 56.3 | 67.9 | 64.6 |
| Eraring | 0.34 | 75 | 34.4 | 61.7 | 72.8 | 75.9 |
| Callide | 0.33 | 200 | 36.8 | 59.9 | 69.0 | 74.4 |
| Bayswater | 0.30 | 155 | 39.0 | 66.5 | 73.2 | 78.7 |
| Collie | 0.31 | 135 | 36.0 | 61.3 | 74.2 | 80.8 |
| Gladstone | 0.30 | 230 | 37.5 | 61.3 | 70.5 | 71.2 |
| Melbourne | 0.30 | 150 | 40.1 | 63.4 | 72.6 | 79.2 |
| Port Augusta | 0.28 | 180 | 39.9 | 68.1 | 81.6 | — |

It is preferable that the fly ash has a median particle size ranging from 3 to 10 microns to improve its reactivity. This particle size range can be achieved by milling the fly ash or classifying the fly ash by centrifugation before being stored in hopper 10.

The slag may be obtained from iron blast furnaces and subsequently quenched to maximise its glass content. The granulated (quenched) slag has a median particle size ranging from 5 to 10 microns to improve its early age reactivity. Granulated slag with a median particle size ranging from 5 to 10 microns also increases the compressive strength of the prepared geopolymer concrete. This particle size range can be achieved by milling the granulated slag before storing in hopper 12. However, it can be appreciated that silico-aluminate material of any particle size can also be used for preparing the geopolymer cement. Additionally, other silico-aluminate material such as zeolites, pitchstone and ground glass can be added or substitute the fly ash in particular.

The fly ash and granulated slag are ground in grinder 14 to improve intermixing and homogeneity of the two components and further increase the reactivity of both components (FIG. 1A). Alternatively, the fly ash, granulated slag and sodium carbonate may be ground in grinder 14 to improve intermixing of the three components and further increase the reactivity of the components (FIG. 1B). The grinding also increases the strength performance of the geopolymer cement. Additives such as limestone and other inert minerals may also be added to alter the properties of the geopolymer cement.

When the fly ash and granulated slag are ground in grinder 14 (FIG. 1A), the mixture from grinder 14 is subsequently mixed with sodium carbonate from hopper 16 and sodium silicate from hopper 20 in blender 18 to form the geopolymer cement in the form of a powdered mixture. The mixing process improves the homogeneity of the components and product uniformity. The sodium silicate has a modulus of 1.5-3.3. The sodium silicate is not ground in grinder 14 to prevent sodium silicate degrading from the heat generated during the grinding process.

When the fly ash, granulated slag and sodium carbonate are ground in grinder 14 (FIG. 1B), the mixture from grinder 14 is subsequently mixed with sodium silicate from hopper 20 in blender 18 to form the geopolymer cement in the form of a powdered mixture.

The sodium carbonate in the powdered mixture has a median particle size ranging from 80 to 200 microns to improve its solubility. This median particle size range can be achieved by milling the sodium carbonate prior to storage in hopper 16.

The geopolymer cement from blender 18 is stored in silo 22 before transport to a concrete plant. The geopolymer cement composition is typically (by mass) 8% sodium silicate; 8% sodium carbonate; and 84% fly ash and granulated slag.

The content of each of sodium silicate and sodium carbonate can range from 2% to 20% (by mass) of the geopolymer cement composition. Preferably, the content of each of sodium silicate and sodium carbonate ranges from 4% to 15% (by mass) of the geopolymer cement composition.

A retarder including boric acid or salts of boric acid, or an accelerator including calcium-based material such as hydrated lime, quicklime or Portland cement may be added to the geopolymer cement during the cement manufacturing process. The retarder or accelerator can be added to either blender 18 or silo 22.

The use of a solid component activator allows the raw material and the finished product of the geopolymer cement manufacture to be transported using the same equipment, such as powder tankers, that are used for transporting Portland cement. In contrast, special equipment is required for handling liquid alkali activators. Additionally, none of the raw materials used to produce the geopolymer cement of the present invention possess Dangerous Goods classification. The geopolymer cement product also has an alkalinity similar to OPC.

The use of the solid component activator also allows the finished product of the geopolymer cement to be stored in the same silos at the concrete batching plant as are used for Portland cement. The finished geopolymer cement can also be weighed using the same weighing equipment as used for Portland cement. In contrast, special equipment is required for the storage of liquid activators and their dosing into the concrete mixes.

The geopolymer cement is mixed with water and aggregates such as gravel and sand to form geopolymer concrete. Mixing water with the geopolymer cement creates a high pH environment to activate the fly ash and granulated slag. Water can be added to provide a no-slump concrete with a slump value of 0 mm. Additional water may be added to provide a normal slumping concrete with a slump of 80 mm to 200 mm. Further water addition provides a flowing geopolymer concrete at up to 650 mm spread without segregating the component materials. Activating the geopolymer cement increases the reactivity of the fly ash and granulated slag and binds these components with the aggregate to form concrete.

The setting time of the geopolymer concrete can be controlled by adding retarders or accelerators to the mixture.

The geopolymer concrete can be cured without heating. For example, curing can occur at an ambient temperature ranging from 10° C. to 40° C. Alternatively, the geopolymer concrete can be heat cured at a temperature ranging from 40° C. to 70° C.

Heat curing accelerates the strength growth rates of the geopolymer concrete. Table 2A provides formulations for G1 and G2, Table 2B provides data showing the effect of composition and curing temperature on concrete strength and FIG. 2C compares the properties of geopolymer concrete subjected to heat and ambient curing according to one form of the present invention.

As provided in Table 2C, heat curing Mix 1 at 70° C. for 4 hours imparts a heat cured compressive strength of 15-40 MPa. This value is comparable to a heat curing compressive strength of 20-40 MPa obtained by ambient curing the same geopolymer concrete for 3 days.

TABLE 2A

Geopolymer Cement Formulations

| Product | Slag (%) | Fly Ash (%) | Sodium Silicate (%) | Sodium Carbonate (%) |
|---|---|---|---|---|
| G1 | 34 | 50 | 8 | 8 |
| G2 | 50 | 34 | 8 | 8 |

TABLE 2B

Geopolymer Cement Formulations and Concrete Strength

| Cement Composition (%) | | | | Concrete Data | | | Curing/Strength | |
|---|---|---|---|---|---|---|---|---|
| | | | | | | | 75° C./ | 23° C./ |
| Slag | Fly Ash | SS | SC | Cement kg·m⁻³ | W/C | Slump (mm) | 16 hr MPa | 28 d MPa |
| 25 | 61 | 6 | 8 | 390 | 0.28 | 150 | 17.0 | 54.9 |
| 25 | 61 | 7 | 7 | 390 | 0.29 | 75 | 36.1 | 48.5 |
| 25 | 61 | 8 | 6 | 390 | 0.28 | 170 | 50.9 | 56.0 |
| 25 | 59 | 8 | 8 | 390 | 0.28 | 85 | 58.6 | 59.9 |
| 35 | 49 | 6 | 10 | 390 | 0.29 | 160 | 25.3 | 72.9 |
| 35 | 51 | 7 | 7 | 390 | 0.28 | 150 | 30.0 | 61.9 |
| 35 | 49 | 8 | 8 | 390 | 0.29 | 160 | 66.0 | 73.0 |
| 35 | 49 | 10 | 6 | 390 | 0.32 | 110 | 53.4 | 64.3 |

TABLE 2C

Ranges of Composition/Compressive Strength Performance

| Mix | Major silico-aluminate material | Slag (%) | Fly Ash (%) | SS (%) | SC (%) | Heat Curing (70° C.) Comp. Strength (MPa) | | | Ambient Curing (23°) Comp. Strength (MPa) | | |
|---|---|---|---|---|---|---|---|---|---|---|---|
| | | | | | | 2 hours | 4 hours | 12 hours | 3 days | 7 days | 28 days |
| 1 | Fly Ash | 21-40 | 63-44 | 4-10 | 4-10 | 5-15 | 15-40 | 40-60 | 20-40 | 50-60 | 60-80 |
| 2 | Slag | 40-84 | 24-44 | 6-10 | 6-10 | 10-30 | 30-50 | 50-70 | 30-50 | 50-70 | 70-80 |

Notes:
SS = sodium silicate
SC = sodium carbonate

Similarly, heat curing Mix 2 at 70° C. for 4 hours imparts a heat curing compressive strength of 30-50 MPa. This value is the same as the heat curing compressive strength obtained by ambient curing the same geopolymer concrete for 3 days.

It was found that the compressive strengths after curing for 4 hours at 70° C. is about 40% the maximum strength of the concrete, and curing for 12 hours at 70° C. is about 80% the maximum strength of the concrete.

Table 3 provides trial results of geopolymer concrete manufactured in the field, at a precast concrete operation, using geopolymer cement G2 as defined in Table 2A and provides a comparison of the compressive strengths of Mix 1 and Mix 2 when (i) steam cured for 1 and 2 hours, and (ii) then cured at 23° C. for 7, 14, 21 and 28 days.

TABLE 3

Precast Concrete - Field Trial Mixes

| | Mix | |
|---|---|---|
| Components | 1 kg·m⁻³ | 2 kg·m⁻³ |
| 10 mm aggregate | 650 | 880 |
| Coarse Sand | 915 | 500 |
| Fine Sand | 255 | 355 |
| Cement | 366 | 503 |
| Water | 144 | 154 |
| Density | 2330 | 2390 |
| Flow (mm) | 400 | 600 |
| w:c | 0.39 | 0.31 |

Precast Concrete - Field Trial* - Concrete Strengths

| | Mix 1 MPa | Mix 2 MPa |
|---|---|---|
| 1 hr steam @ 60° C. | <1 | <1 |
| 2 hr steam @ 60° C. | <1 | 27 |
| Overnight (60° C. to ambient - steam off after 2 hrs) | 9.5 | 40.5 |
| 7 days @ 23° C.* | 43.1 | 53.5 |
| 14 days @ 23° C.* | 53.5 | — |
| 21 days @ 23° C.* | 58.6 | — |
| 28 days @ 23° C.* | 63.4 | 73.1 |

*Note: Box culverts cast under typical plant conditions.
**Note: Precast elements stored under ambient conditions after overnight cooling.

Table 4 provides laboratory trial test results for (i) Concrete containing Portland cement (OPC)(denoted as GP, GBF, GBS and GBFS), (ii) geopolymer concrete made using a solid component activator (denoted as G1 and G2) and (iii) geopolymer concrete with made using liquid alkali activators (denoted as L1 and L2).

Table 4 reveals that the compressive and tensile strengths of G1 and G2 are at least comparable with the corresponding properties of the Portland cement concrete and geopolymer concrete made using a liquid alkali activator.

TABLE 4

SLUMPING CONCRETE

Laboratory Trials - Portland cement based concretes (OPC alone and OPC plus various supplementary cementitious materials versus geopolymer concretes (solid component activated geopolymers) & liquid activated geopolymers
Cementitious Contents - 400 kg/m$^{-3}$ for all mixes
Concrete Curing Conditions - Ambient (23° C.)
Cementitious Material Combinations:
    Type GP - 100% OPC
    Type GBF - 75% OPC + 25% fly ash
    Type GBS - 60% OPC + 40% slag
    Type GBFS - 55% OPC + 25% fly ash + 20% slag
    G1 - Solid component activator - dry powder geopolymer cement
    G2 - Solid component activator - dry powder geopolymer cement
    L1 - Liquid activated geopolymer - lime/fly ash blend
    L2 - Liquid activated geopolymer - slag/fly ash blend

| W/C RATIOS | Cement/Binder ID | | | | | | | |
|---|---|---|---|---|---|---|---|---|
| | GP | GBF | GBS | GBFS | G1 | G2 | L1 | L2 |
| Constant Flow w/c Ratios | 0.476 | 0.411 | 0.467 | 0.427 | 0.300 | 0.333 | 0.297 | 0.297 |
| Concrete w/c Ratios | 0.455 | 0.407 | 0.455 | 0.414 | 0.264 | 0.283 | 0.237 | 0.237 |
| Slump (mm) | 85 | 85 | 75 | 90 | 185 | 210 | 225 | 220 |

| Cement | Compressive Strength (MPa) | | | | Tensile Strength (MPa) | Drying Shrinkage (microstrain) |
|---|---|---|---|---|---|---|
| | 3 days | 7 days | 28 days | 47 days | 47 days | 56 days |
| GP | 36 | 43 | 50 | 51 | 4.6 | 480 |
| GBF | 30 | 40 | 51 | 57 | 5.3 | 440 |
| GBS | 27 | 40 | 55 | 56 | 5.2 | 530 |
| GBFS | 24 | 36 | 55 | 58 | 5.0 | 460 |
| G1 | 36 | 59 | 84 | 95 | 6.9 | 520 |
| G2 | 51 | 71 | 92 | 100 | 7.1 | 540 |
| L1 | 23 | 44 | 73 | 83 | 7.0 | 420 |
| L2 | 20 | 40 | 72 | 80 | 7.0 | 425 |

For example, the compressive strengths of G1 and G2 after 47 days of curing are greater than that of Portland cement concrete and geopolymer concrete made using a liquid alkali activator. In Table 4, the compressive strengths of G1 and G2 range from 95-100 MPa, whereas the compressive strengths for (i) GP, GBF, GBS and GBFS range from 50-58 MPa and (ii) L1 and L2 range from 80-83 MPa.

The tensile strengths of G1 and G2 after 47 days of curing are comparable to that of geopolymer concrete made using a liquid alkali activator and greater than that of Portland cement concrete. For example, in Table 4, the tensile strengths of G1 and G2 are about 7 MPa, which is similar to L1 and L2. In contrast, the tensile strengths for GP, GBF, GBS and GBFS are lower, ranging from 4.5-5.5 MPa.

Table 5 provides the properties of dry cast Portland cement concrete and geopolymer concrete made using geopolymer cement G2.

A comparison of the drying shrinkage of different concrete samples in Table 5 reveals that G1 and G2 have a $U_{strain}$ value of about 550 after 60 days, while the $U_{strain}$ values of (i) GP, GBF, GBS and GBFS range from 450 to 550 and (ii) L1 and L2 is about 450 after 60 days.

TABLE 5

DRY CAST (ZERO SLUMP) CONCRETE
Concrete Compressive Strength Results for
"Dry Cast" Concrete Mixes - Binder Type G2.

| Dry Cast Mix Description | Cement (kg/m³) | W/C | Slump (mm) | Modified Vebe (s) | Curing at 23° C. (MPa) | | |
|---|---|---|---|---|---|---|---|
| | | | | | 3 days | 7 days | 28 days |
| Plant OPC Control Lab Mix - Lab Aggregate | 525 | 0.35 | 0 | 20 | | 50.8 | 53.5 |
| Geopolymer Cement Lab Mix - Lab Aggregate | 525 | 0.24 | 0 | 20 | 49.4 | 67.9 | 80.3 |
| Geopolymer Cement Lab Mix - Plant Aggregate | 525 | 0.34 | 0 | 20 | 43.0 | | |

TABLE 5-continued

DRY CAST (ZERO SLUMP) CONCRETE
Concrete Compressive Strength Results for
"Dry Cast" Concrete Mixes - Binder Type G2.

| Dry Cast Mix Description | Cement (kg/m³) | W/C | Slump (mm) | Modified Vebe (s) | Curing at 23° C. (MPa) | | |
|---|---|---|---|---|---|---|---|
| | | | | | 3 days | 7 days | 28 days |
| Geopolymer Cement Plant Trial - Plant Aggregate | 525 | 0.4 | 0 | N/A | 36.7 | | |

Note
Cylinders air cured - ambient temperature

Properties of dry cast (zero slump) and flowing geopolymer concrete made using a solid component activator is further provided in Tables 5 and 6.

Table 6 compares the properties of flowing geopolymer concrete made using geopolymer cement G2 at different water/cement (w:c) ratios.

TABLE 6

SUPER WORKABLE FLOWING CONCRETE
Concrete Compressive Strength Results for "Super
Workable" Concrete Mixes - Binder Type G2.

| Super Workable Mix Description | Cement (kg/m³) | W/C | Spread (mm) | Curing at 75° C. (MPa) | | | | Curing at 23° C. (MPa) | | | | |
|---|---|---|---|---|---|---|---|---|---|---|---|---|
| | | | | 3 hrs | 4 hrs | 5 hrs | 16 hrs | 1 day | 3 days | 7 days | 28 days | 56 days |
| Geopolymer Cement Lab Mix - Lab Aggregate | 550 | 0.29 | 580 | | | | | | 62.0 | 77.0 | 99.0 | |
| Geopolymer Cement Lab Mix - Plant Aggregate | 550 | 0.32 | 645 | 33.8 | | 45.6 | 66.8 | | 45.9 | | 83.0 | 91.2 |
| Geopolymer Cement Lab Mix - Plant Aggregate | 500 | 0.38 | 600 | | 44.7 | | 75.8 | 17.2 | | | | |

Table 7 provides field trial data showing the transverse breaking load performance of various roof tiles made in a conventional roof tile plant using Portland cement concrete and geopolymer concrete made using a solid component activator and using the same aggregate:cement ratios and under the same manufacturing and curing conditions.

The tests in Table 7 were conducted on different roof tile types, specifically, (A) ridge cap and (B) low-profile double roman tiles.

TABLE 7

CONCRETE ROOF TILES

Concrete roof tiles produced using the same sand:cement ratio and to similar plastic concrete consistency as normal OPC mix. The concrete is extruded through a conventional industrial roof tile plant. All roof tiles are subjected to the same curing conditions in the roof tile factory. Testing was carried out by the roof tile manufacturer.

| Tile Type A: | Ridge Cap (Trim) |
|---|---|
| Aggregate:Cement Ratio: | 3.75:1 |
| Water Content(%): | 7.4 |
| Curing Conditions: | Typical concrete roof tile kiln; maximum 40° C. @ 90% relative humidity for 10-12 hours before testing (Day 1); then kept on shelf under ambient conditions until testing at ages of 4 days and 7 days |

Strength Performance:

| | Transverse Breaking Load (N)* | |
|---|---|---|
| Time (days) | OPC Control | Geopolymer Trial |
| 1 | 1179 | 1568 |
| 4 | 1435 | 1673 |
| 7 | 1484 | 1645 |

*Note: TBL values are the mean of at least six specimens

| Tile Type B: | Low-Profile Double Roman (Curve) |
|---|---|
| Aggregate:Cement Ratio: | 3.5:1 |
| Water Content(%): | 7.4 |
| Curing Conditions: | Typical concrete roof tile kiln, maximum 40° C. @ 90% relative humidity for 10-12 hours before testing (Day 1); then kept on shelf under ambient conditions until testing at age of 9 days |

TABLE 7-continued

Strength Performance:

| | Transverse Breaking Load (N)* | |
|---|---|---|
| Time (days) | OPC Control | Geopolymer Trial |
| 1 | 1350 | 1840 |
| 9 | 2037 | 2172 |

*Note: TBN results are mean of at least five samples
Effect of Various Curing Conditions:

| Curing Conditions: | Times - as per table Temperatures (various) - as per table Humidity - 90% RH |
|---|---|

Strength Performance:

| Time (Hours) | Temperature (° C.) | Transverse Breaking Load (N)* Geopolymer Trial |
|---|---|---|
| 3 | 70 | 1977 |
| 4 | 70 | 2037 |
| 5 | 70 | 2071 |
| 24 | 28 | 1717 |
| 24 | 36 | 1798 |
| 24 | 40 | 1968 |

*Note: TBN results are mean of at least three samples

The results from both tests reveal that the transverse breaking load for the geopolymer concrete roof tiles made using a solid component activator is greater than that of Portland cement concrete roof tiles regardless of curing time. Accordingly, the various test results demonstrate that the properties of geopolymer concrete made using a solid component activator is comparable to both Portland cement concrete and geopolymer concrete made using a liquid alkali activator.

The use of a solid component activator also increases the ease in handling and storage of the raw materials and the finished product of the geopolymer cement manufacturing process. In contrast, liquid components often require special equipment and risk leakage that may cause safety and environmental issues.

The geopolymer cement according to the present invention can be used to produce a range of products including (a) slumping concrete, (b) dry cast concrete, (c) flowing concrete, (d) medium strength concrete (40-50 MPa), (e) high strength concrete (80-100 MPa), (f) low heat concrete and (g) ASR-resistant concrete.

Advantageously, the present invention provides a geopolymer cement that is as safe and easy to handle as OPC. The geopolymer cement of the present invention may also produce concrete with comparable properties to concrete produced using geopolymer cement made using a liquid alkali activators or concrete made using Portland cement.

The geopolymer cement of the present invention may also be used as a universal substitute for Portland cement in a variety of applications. Additionally, the concrete prepared from the geopolymer cement of the present invention also has a reduced carbon footprint compared to concrete prepared using Portland cement.

The invention claimed is:

1. A geopolymer cement comprising at least one silico-aluminate material including fly ash having a median particle size ranging from 3 to 10 microns and slag having a median particle size ranging from 5 to 10 microns, wherein the amount of fly ash ranges from 58-71 wt % of the slag and fly ash mixture, a solid component activator comprising sodium carbonate and sodium silicate for activating the at least one silico-aluminate material for forming a geopolymer concrete.

2. The geopolymer cement as claimed in claim 1, wherein the at least one silico-aluminate material further comprises any one or a combination of pitchstone, blast furnace slag, ground glass or zeolite.

3. The geopolymer cement as claimed in claim 1, wherein the geopolymer cement includes a retarder comprising boric acid and/or salts of boric acid.

4. The geopolymer cement as claimed in claim 1, wherein the geopolymer cement includes an accelerator comprising soluble calcium-based material including hydrated lime, quicklime or Portland cement.

5. A method for preparing a geopolymer cement comprising the steps of: mixing at least one silico-aluminate material including fly ash having a median particle size ranging from 3 to 10 microns and slag having a median particle size ranging from 5 to 10 microns, wherein the amount of fly ash ranges from 58-71 wt % of the slag and fly ash mixture, with sodium carbonate; grinding the at least one silico-aluminate material and sodium carbonate to a median particle size ranging from 3 to 10 microns to form a powdered mixture; and mixing sodium silicate with the powdered mixture to form the geopolymer cement.

6. The method as claimed in claim 5, wherein the method is carried out at a temperature ranging from 10° C. to 40° C.

7. The method as claimed in claim 5, further comprising a step of adding a retarder to the powdered mixture.

8. The method as claimed in claim 5, further comprising a step of adding a retarder to the geopolymer cement after mixing sodium silicate with the powdered mixture.

9. The method as claimed in claim 7, wherein the retarder comprises boric acid and/or salts of boric acid.

10. The method as claimed in claim 5, further comprising a step of adding an accelerator to the powdered mixture.

11. The method as claimed in claim 5, further comprising a step of adding an accelerator to the geopolymer cement after mixing sodium silicate with the powdered mixture.

12. The method as claimed in claim 10, wherein the accelerator comprises soluble calcium-based material including hydrated lime, quicklime or Portland cement.

13. A geopolymer concrete comprising at least one silico-aluminate material including fly ash having a median particle size ranging from 3 to 10 microns and slag having a median particle size ranging from 5 to 10 microns, wherein the amount of fly ash ranges from 58-71 wt % of the silico-aluminate material, a solid component activator comprising sodium carbonate and sodium silicate, an aggregate and water, wherein the water solubilises the solid component activator to form an alkaline environment for activating the at least one silico-aluminate material to bind the at least one silico-aluminate material with the aggregate to form the geopolymer concrete.

14. The geopolymer concrete as claimed in claim 13, wherein the alkaline environment ranges from a pH of 12 to 14.

15. The geopolymer concrete as claimed in claim 13, wherein the geopolymer concrete flows at up to 650 mm spread without segregating components of the geopolymer concrete.

* * * * *